(No Model.) 3 Sheets—Sheet 2.
T. W. CAPEN.
FRICTION CLUTCH AND BRAKE.
No. 404,776. Patented June 4, 1889.
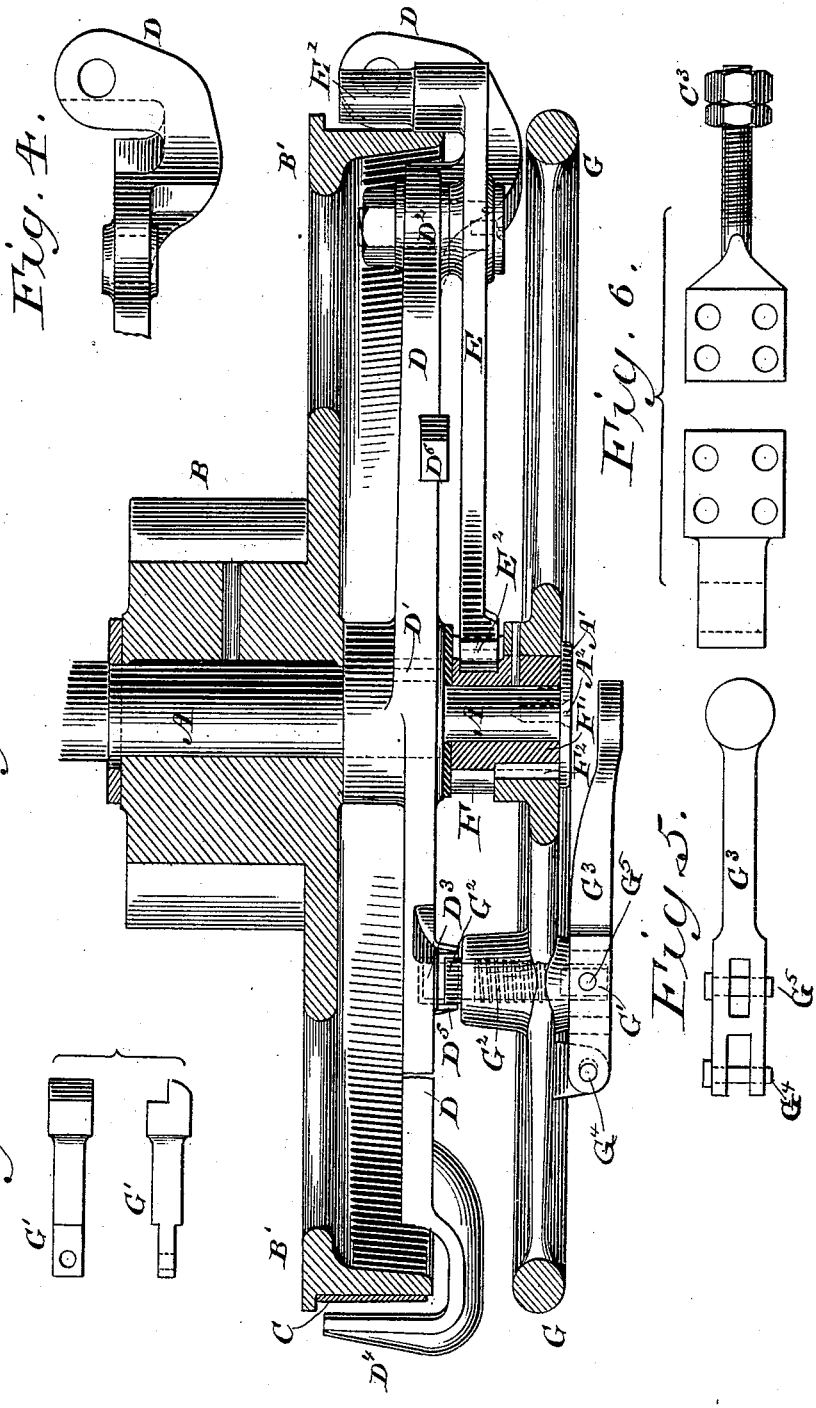
WITNESSES
H. C. Newman,
E. S. Newman.
INVENTOR
Thomas W. Capen,
By his Attorneys
Marcus S. Hopkins.
Joseph L. Atkins.

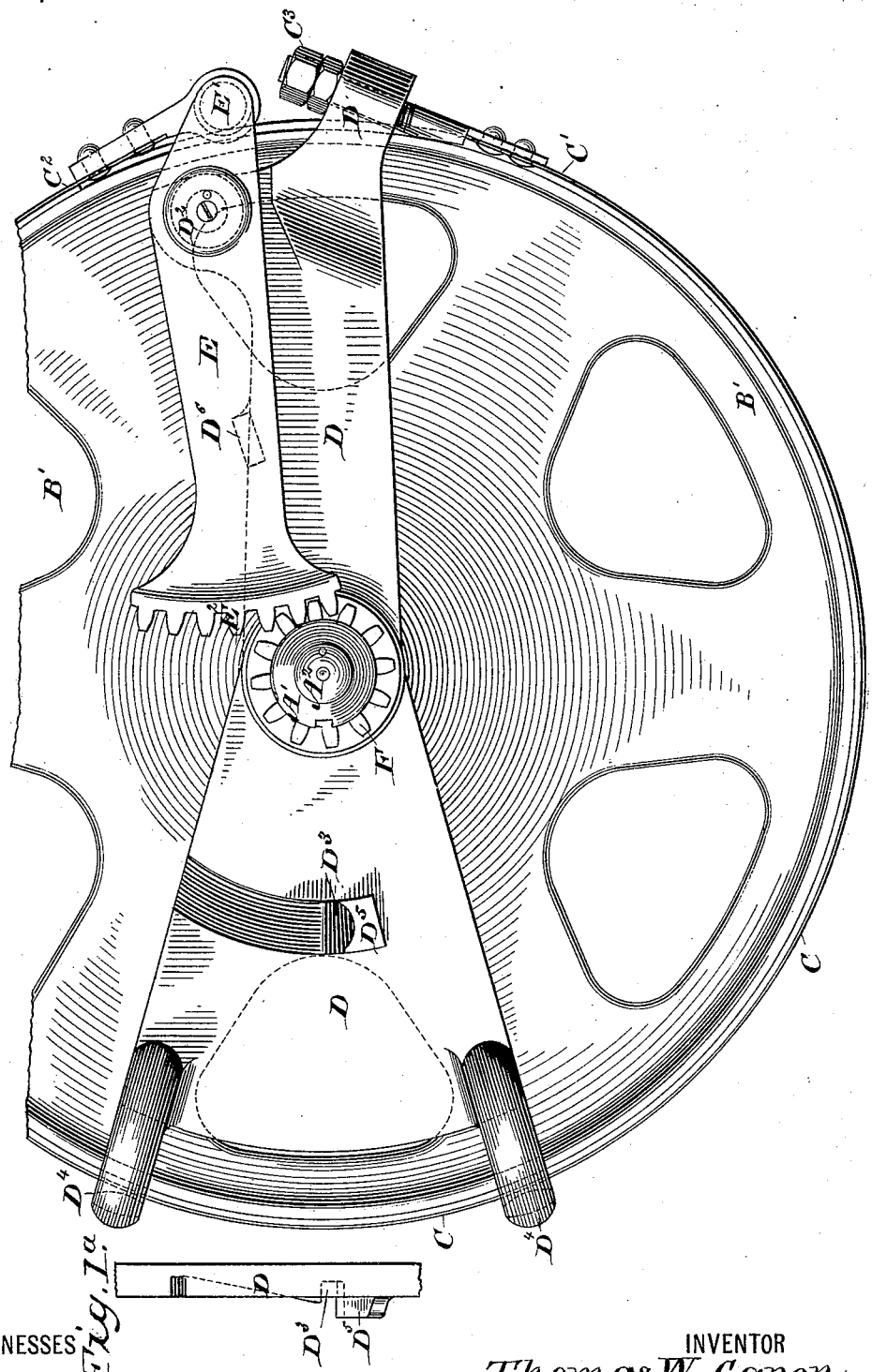

(No Model.) 3 Sheets—Sheet 3.

T. W. CAPEN.
FRICTION CLUTCH AND BRAKE.

No. 404,776. Patented June 4, 1889.

WITNESSES
H. C. Newman,
O. S. Newman.

INVENTOR
Thomas W. Capen,
By his Attorney
Marcus S. Hopkins.
Joseph L. Atkins.

N. PETERS. Photo-Lithographer, Washington, D. C.

UNITED STATES PATENT OFFICE.

THOMAS W. CAPEN, OF STAMFORD, CONNECTICUT, ASSIGNOR TO THE YALE & TOWNE MANUFACTURING COMPANY, OF SAME PLACE.

FRICTION CLUTCH AND BRAKE.

SPECIFICATION forming part of Letters Patent No. 404,776, dated June 4, 1889.

Application filed October 12, 1888. Serial No. 287,889. (No model.)

*To all whom it may concern:*

Be it known that I, THOMAS W. CAPEN, of Stamford, in the county of Fairfield and State of Connecticut, have invented an Improved Friction Clutch and Brake, of which the following is a specification, reference being had to the accompanying drawings.

In Figures 1 and 2 I illustrate my invention by its application to one of the spur-pinions of a hoisting-crab, for the purpose of frictionally clutching the said pinion to its shaft and of controlling the backward motion which occurs in lowering a load.

Figure 7:
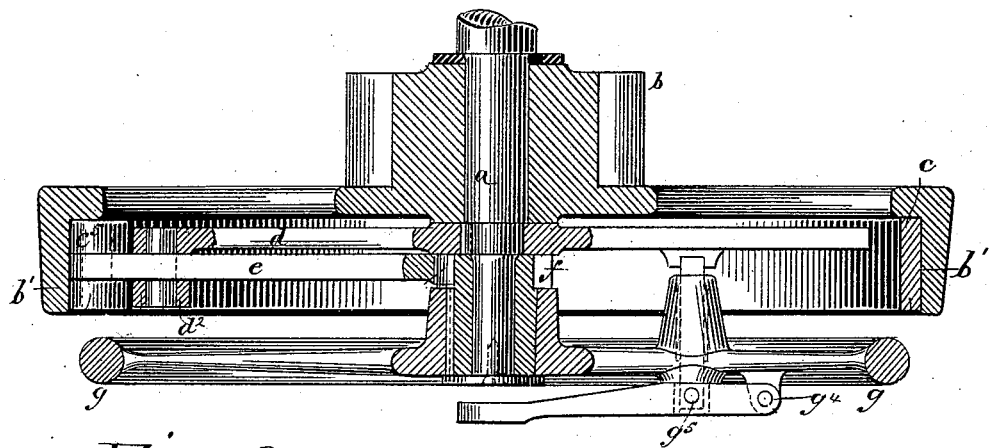

Figure 1 is a side elevation of my improved friction clutch and brake mechanism, partly broken away. Fig. 1$^a$ is a partial end view of the casting D detached for the purpose of showing more clearly the relation of the parts $D^3$ and $D^5$, described below. Fig. 2 is a central section of the device shown in Fig. 1, differing only in showing the hand-wheel, which is removed from the view in Fig. 1 for better illustration of other parts. Figs. 3, 4, 5, and 6 are detailed views of parts detached, which are indicated by letters in the description below. Fig. 7 is a central section, and Fig. 8 a side elevation, of a formal modification of my device adapted to the use of an expanding brake-strap acting upon an internal brake-surface.

A is the projecting end of a driven shaft in a crab or crane, and loose thereon is the pinion B, which requires to be frictionally coupled to the said shaft or to be released therefrom and its motion controlled, as when lowering a load. The pinion B is integral with a brake-rim B', the latter being made for the frictional action thereon of a brake-strap C, the fixed end of which, C', is supported by one end of the casting D. The said casting is a fixture to the shaft by means of the key D'. The moving end $C^2$ of the strap C is pivoted upon a stud E' in the short arm of the brake-lever E. The lever E is fulcrumed upon a stud $D^2$ in the casting D. The long arm of the lever E is provided at its inner end toward the shaft with a segmental gear $E^2$, and the latter engages with a pinion F, turning freely on the outer extremity of the shaft A, and kept in position thereon by a disk A' and screw $A^2$. The pinion F, at its boss F', is keyed to the lever or hand-wheel G by a key $F^2$. The said hand-wheel, pinion, and brake-lever serve to operate the strap C, as referred to hereinafter; but any other means may be employed to operate the pinion.

G' is a bolt pressed by a spring $G^2$ into a socket $D^3$ in the casting D, to automatically lock the hand-wheel and brake-strap in the clutched position.

$G^3$ is a lever pivoted to the hand-wheel D by the pin $G^4$ and to the bolt G' by the pin $G^5$, and adapted to withdraw the bolt G' and free the hand-wheel G, so that it can be turned either way to apply or release the strap from the rim B'. The free end of the lever $G^3$ is at the center of the shaft A, and is thus easily accessible to the hand of the operator, regardless of the point at which the hand-wheel is left at rest. The arc of motion of the hand-wheel upon the shaft A is limited at one end—at the bolt-socket $D^3$—by a projection $D^5$ on the casting D, and at the other end by a similar projection $D^6$, against which projection the bolt G' impinges. The strap is so adjusted in length by the nuts $C^3$ that the motion of the hand-wheel up to the locking-point of the bolt G' in the socket $D^3$ will give sufficient tension to the strap to frictionally clutch the rim B' and pinion B. Upon withdrawing the bolt G' by the lever $G^3$ and freeing the hand-wheel the latter may then be manipulated to control by the brake-strap any tendency to backward motion in the pinion B, and the pinion can be reclutched by moving the hand-wheel to the point where the bolt G', impelled by its spring, can again shoot into the socket $D^3$.

The casting D is extended radially at $D^5$ on one side to carry the strap-guides $D^4$ $D^4$, which hold the strap when slack from sagging outwardly too much at its mid-portion. This extension or arm of the casting D also forms a counterpoise for the other arm carrying the brake-lever and strap ends.

It is obvious that the frictional and operating parts described are equally applicable to a drum, pulley, or other rotary part which requires to be frictionally coupled to its shaft.

Figure 8:
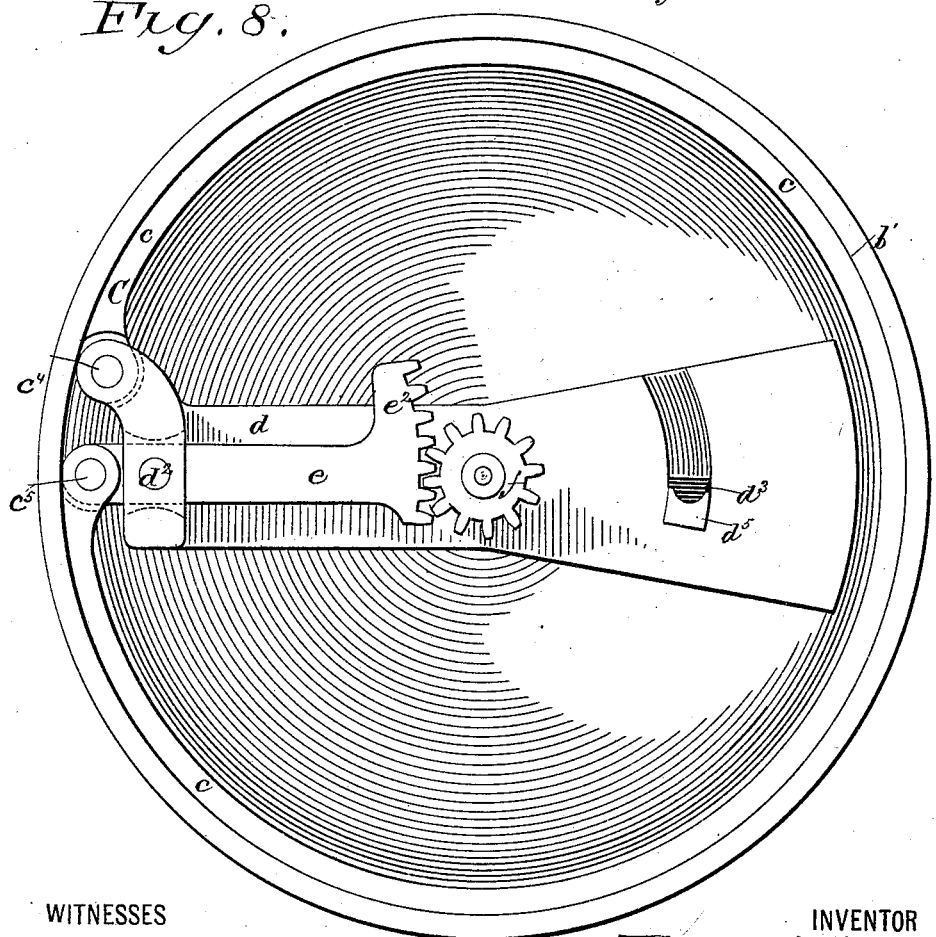

Figs. 7 and 8 represent a formal modification adapted to the use of an expanding-strap acting upon an internal brake-surface. In these figures, $a$ is the shaft; $b$, the pinion to be clutched; $b'$, the internal brake-rim; $c$, the expanding-strap having a fixed end pivoted at $c^4$ to the casting $d$ and a moving end pivoted at $c^5$ to the outer end of the lever $e$. The lever $e$ is pivoted at its fulcrum to the casting $d$ upon a stud $d^2$. The toothed segment $e^2$ and engaged pinion $f$, the hand-wheel $g$, and details are all similar to those of Figs. 1 and 2, as also the operation.

What I claim is—

The combination of a driving-shaft, a wheel provided with a friction-rim turning loosely on the shaft, a casting D, secured to the driving-shaft, a brake-lever pivoted to the casting, a strap secured at one end to the casting and at the other to the brake-lever, a pinion engaging with said lever to operate it, a handle secured to said pinion, and a locking device consisting of the socket $D^3$ in the casting, the bolt $G'$, and the lever $G^3$, secured thereto in the handle, adapted to lock the handle in place, substantially as set forth.

In testimony of all which I have hereunto subscribed my name.

THOS. W. CAPEN.

Witnesses:
JNO. W. MESERVE,
WARREN MORSE.